United States Patent [19]
Wang

[11] Patent Number: 5,943,203
[45] Date of Patent: Aug. 24, 1999

[54] ELECTRONIC CIRCUIT BREAKER

[75] Inventor: Minhui Wang, Diamond Bar, Calif.

[73] Assignee: Linfinity Microelectronics Inc., Garden Grove, Calif.

[21] Appl. No.: 08/928,269

[22] Filed: Sep. 12, 1997

[51] Int. Cl.$^6$ ...................................................... H02H 3/00
[52] U.S. Cl. .................................. 361/75; 361/93; 361/103
[58] Field of Search ........................... 361/79, 71, 72–75, 361/91, 92, 103, 93, 110; 323/901

[56] References Cited

U.S. PATENT DOCUMENTS

| | | | |
|---|---|---|---|
| 3,875,463 | 4/1975 | Reuter et al. | 361/29 |
| 4,084,204 | 4/1978 | Jacobus, Jr. | 361/72 |
| 4,223,365 | 9/1980 | Moran | 361/71 |
| 4,331,997 | 5/1982 | Engel et al. | 361/93 |
| 4,371,824 | 2/1983 | Gritter | 318/722 |
| 4,544,981 | 10/1985 | Hakoopian | 361/93 |
| 4,686,383 | 8/1987 | Croft | 327/198 |
| 5,119,265 | 6/1992 | Qualich et al. | 361/103 |
| 5,400,206 | 3/1995 | Barnes et al. | 361/72 |
| 5,581,433 | 12/1996 | Jordan | 361/93 |
| 5,698,973 | 12/1997 | Goerke et al. | 323/901 |

*Primary Examiner*—Michael J. Sherry
*Attorney, Agent, or Firm*—Knobbe, Martens, Olson & Bear LLP

[57] ABSTRACT

A monolithic electronic circuit breaker having an input terminal, an output terminal, and a controllable impedance connected between the input and output terminals. A current sensor generates a current magnitude signal indicative of the current flowing between the input and output terminals. In one embodiment, an over-current circuit generates an over-current signal when the current magnitude signal exceeds a threshold. In response to at least a first occurrence of the over-current signal, a control circuit controls the controllable impedance so as to reduce current through the controllable impedance for a period of time, and then automatically increase current through the controllable impedance. Further, in response to an $N^{th}$ (N>1) occurrence of the over-current signal, the control circuit controls the controllable impedance so as to reduce current through the controllable impedance and does not thereafter automatically increase current through the controllable impedance. In another embodiment, an over-current and control circuit controls the controllable impedance so as to reduce current through the controllable impedance when the current magnitude signal exceeds a threshold. A first time period after current through the controllable impedance is reduced, the over-current and control circuit automatically increases current through the controllable impedance by gradually reducing the impedance of the controllable impedance over a second time period. Thus, the impedance at the output terminal slowly transitions from a high impedance state to a low impedance state.

38 Claims, 5 Drawing Sheets

ELECTRONIC CIRCUIT BREAKER

FIELD OF THE INVENTION

The present invention relates to a circuit breaker, and more specifically to an electronic circuit breaker of the type used to connect an electronic device to a power source.

BACKGROUND OF THE INVENTION

An example of a conventional monolithic electronic circuit breaker is described in U.S. Pat. No. 5,581,433. The circuit breaker described therein includes a power MOSFET ("FET") switch that is connected between an input terminal and an output terminal. The power FET is controlled by a maximum current circuit and an over-current circuit. In the maximum current circuit, a linear amplifier compares a signal indicative of the current flowing through the power FET (i.e., the output current of the circuit breaker) with a signal indicative of a maximum current level. The output of the amplifier is coupled to the gate of the power FET in order to open the MOSFET switch. Similarly, the over-current circuit has a comparator that compares the output current with a fault current level threshold, and the output of the comparator is supplied to a timing control circuit. The output of the timing control circuit also controls the state of the switch. The maximum current level and fault current level may be set using external signals or fixed internal reference voltages. Additionally, the circuit breaker of this reference includes such conventional features as a thermal shutdown circuit, a reverse voltage shutdown circuit, and an externally-controlled shutdown control line.

In a typical application, the electronic circuit breaker is connected between an electronic device and a computer bus. When initially connected to the bus or when power is applied, the electronic device immediately begins to draw current from the bus to charge its internal capacitors. The circuit breaker controls and limits the current that the device draws from the bus. In particular, when the output current of the circuit breaker (i.e., the current drawn by the electronic device) is below the fault current level, the switch is closed and the amplifier drives the power FET with a boosted voltage so that the power FET is at maximum conductance. If the output current goes above the fault current level, the comparator signals the timing control circuit and the timing control circuit begins timing the fault condition by charging a capacitor.

If the fault condition persists after the charging time for the capacitor, the switch is opened to turn off the power FET. As a result, current stops flowing through the circuit breaker to eliminate the fault condition. After the period lapses to discharge the capacitor to a second voltage level, the timing control circuit allows current to resume flowing through the circuit breaker transistor. If the fault current level is again exceeded, the timing control circuit begins to recharge the capacitor and the process described above is repeated. Further, if the output current ever exceeds a higher, maximum current level, the current amplifier adjusts the voltage used to drive the power FET so that current is restricted to the maximum current level. In this manner, the circuit breaker permits current above the fault current level and up to the maximum current level until the fault time is exceeded. When the fault time is exceeded, current is discontinued for a predetermined time period and is then restarted. This cycle of temporarily interrupting current is repeated until the fault condition is removed.

Thus, such a conventional circuit breaker is continuously reset regardless of the number of times a fault condition causes the circuit breaker to interrupt the current. However, if a defective or inappropriate electronic device is connected to the bus or a short exists, an over-current condition may exist indefinitely. In other words, the fault condition will persist regardless of the number of times the circuit breaker is reset. In such a situation, the conventional circuit breaker would allow current to flow up to the maximum current level until the fault time is exceeded each time the circuit breaker is reset. This causes unnecessary power consumption and may allow the computer or electronic device to be damaged.

Additionally, the power FET is immediately returned to maximum conductance when the conventional circuit breaker is reset. Thus, a large current can immediately begin flowing through the circuit breaker during the power-up of the electronic device. Such large currents can cause an over-current condition that arbitrarily causes the circuit breaker to trip. Such large start-up currents can also damage the attached device. Besides unnecessarily tripping the breaker, such a situation causes the circuit breaker to incorrectly signal an error, and may increase the time required to power-up a device.

SUMMARY OF THE INVENTION

In view of these drawbacks, it is an object of the present invention to provide an electronic circuit breaker that is automatically reset only a limited number of times. If a fault condition persists after the circuit breaker has been automatically reset a certain number of times, current is permanently limited or halted until the circuit breaker is externally reset. Thus, power consumption is decreased, and there is less of a chance of damaging the devices connected through the circuit breaker.

It is another object of the present invention to provide an electronic circuit breaker with a "soft-start" capability. When current through the circuit breaker is enabled, a path element that acts as the equivalent of a circuit breaker switch slowly transitions from high impedance to low impedance over a time period. This inhibits large currents during power-up, and thus decreases the chance of a current glitch arbitrarily tripping the circuit breaker.

According to one embodiment of the present invention, a monolithic electronic circuit breaker is provided that includes an input terminal, an output terminal, and a controllable impedance connected between the input and output terminals. A current sensor generates a current magnitude signal indicative of the current flowing between the input terminal and the output terminal, and a control circuit controls the controllable impedance. Additionally, an over-current circuit generates an over-current signal when the current magnitude signal exceeds a threshold. In response to at least a first occurrence of the over-current signal, the control circuit controls the controllable impedance so as to reduce current through the controllable impedance for a period of time, and then automatically increase current through the controllable impedance. Further, in response to an $N^{th}$ (N>1) occurrence of the over-current signal, the control circuit controls the controllable impedance so as to reduce current through the controllable impedance and does not thereafter automatically increase current through the controllable impedance. Thus, the electronic circuit breaker of this embodiment is automatically reset only a limited number of times so that power consumption is decreased and there is less of a chance of damaging the devices connected through the circuit breaker.

According to another embodiment of the present invention, a monolithic electronic circuit breaker is provided that includes an input terminal, an output terminal, and a controllable impedance connected between the input and output terminals. A current sensor generates a current magnitude signal indicative of the current flowing between the input terminal and the output terminal. Additionally, an over-current and control circuit controls the controllable impedance so as to reduce current through the controllable impedance when the current magnitude signal exceeds a threshold. A first time period after current through the controllable impedance is reduced, the over-current and control circuit automatically increases current through the controllable impedance by gradually reducing the impedance of the controllable impedance over a second time period, so that the impedance at the output terminal slowly decreases from a high impedance to a low impedance state. Therefore, the circuit breaker of this embodiment has a soft-start capability that decreases the occurrence of large currents during power-up, and thus decreases the chance of a current glitch arbitrarily tripping the circuit breaker or damaging an attached device.

Still other embodiments of the present invention provide methods of controlling electronic circuit breakers. According to one method, current between an input terminal and an output terminal is reduced when the current exceeds a threshold. The circuit breaker is automatically reset N times by increasing current between the input and output terminals after the current has been reduced. After the circuit breaker has been automatically reset N times, if the current again exceeds the threshold, the current between the input terminal and the output terminal is reduced until the circuit breaker is externally reset. According to another method, current between an input terminal and an output terminal is reduced when the current exceeds a threshold. Then, a first time period after current is reduced, current between the input and output terminals is increased by gradually transitioning the impedance at the output terminal of the circuit breaker from a high impedance state to a low impedance state over a second time period, which is longer than the first time period.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

Figure 1:
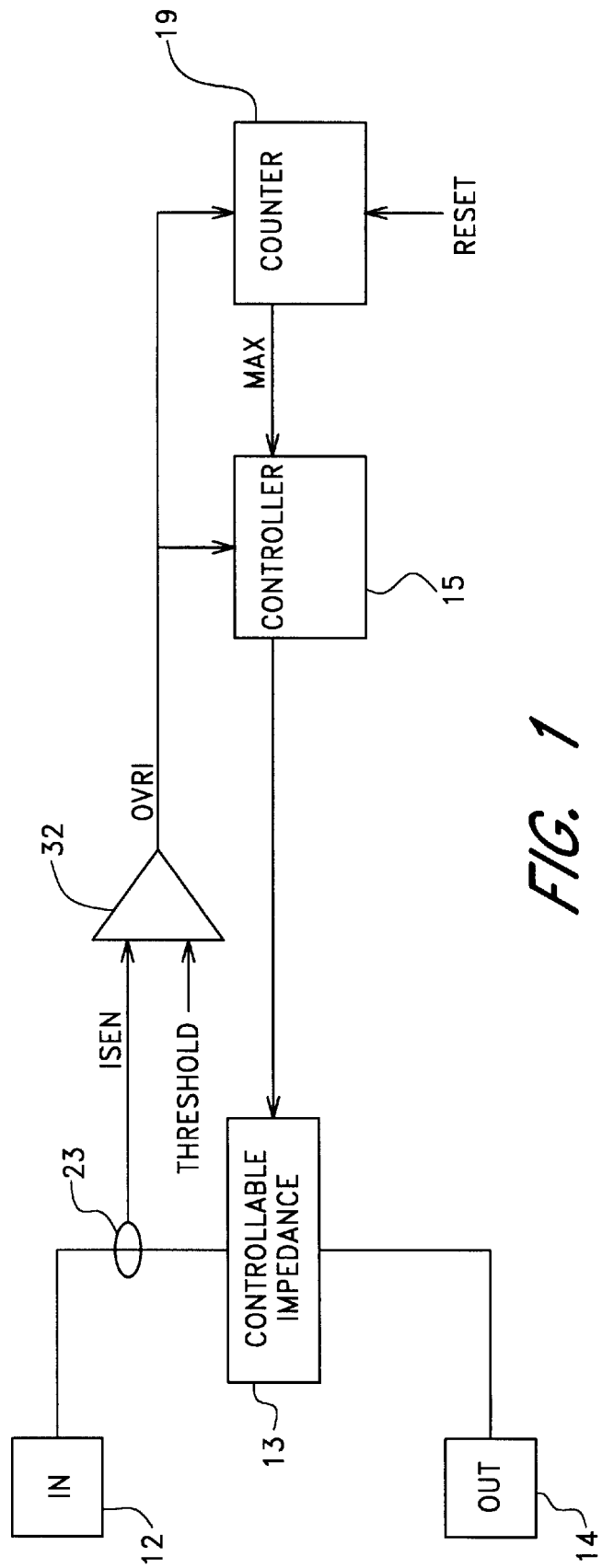
FIG. 1 is a block diagram of an electronic circuit breaker according to an embodiment of the present invention.

FIG. 1 shows a block diagram of an embodiment 10 of an electronic circuit breaker according to the present invention. The electronic circuit breaker includes an input terminal 12, an output terminal 14, and a controllable impedance 13 that is connected in series between the input terminal 12 and the output terminal 14. A current sensor 23 generates a current magnitude signal $I_{SEN}$ that is proportional to the magnitude of the current flowing between the input and output terminals. Additionally, a comparator 32 generates an over-current signal OVRI when the current magnitude signal $I_{SEN}$ exceeds a threshold, and a controller 15 controls the impedance of the controllable impedance 13.

During normal operation, the controller 15 sets the controllable impedance 13 to a minimum value to allow current to flow between the input and output terminals. The current through the controllable impedance is sensed by the current sensor 23, and then compared with the threshold by the comparator 32. If the current rises above the threshold level, the comparator 32 changes the state of the over-current signal OVRI to the controller 15. In response to the over-current signal, the controller 15 increases the impedance of the controllable impedance 13 to temporarily reduce and preferably turn off (except for leakage current) the current through the controllable impedance. The over-current signal OVRI is also supplied to a counter 19 that counts the number of occurrences of the over-current signal. The controller 15 includes timing circuitry so that after a period of time, the controller automatically decreases the impedance of the controllable impedance 13 to again increase the current through the controllable impedance. In this manner, the circuit breaker is tripped and automatically reset in response to a first over-current condition.

Subsequently, if the current again rises above the threshold level, the comparator 32 again changes the state of the over-current signal OVRI supplied to the controller 15 and the counter 19. In response, the controller 15 increases the impedance of the controllable impedance 13 to again temporarily reduce current through the controllable impedance. Additionally, if the counter 19 has counted up to the maximum number of over-current conditions (e.g., 2), a maximum count signal MAX is supplied to the controller 15. In response to the maximum count signal, the controller 15 maintains the controllable impedance 13 in the increased impedance state so that the circuit breaker is not automatically reset. At this point, the circuit breaker embodiment 10 must be externally reset to resume normal operation. In this manner, when the current through the controllable impedance exceeds the threshold level a certain number of times, the current between the input terminal 12 and the output terminal 14 is reduced and the circuit breaker must be externally reset.

In a preferred embodiment, when the circuit breaker circuit 10 is tripped for the first time after power is applied or the circuit breaker circuit 10 is reset, the controller 15 sets the controllable impedance 13 into a high impedance state to virtually eliminate current from flowing between the input and output terminals. Then, the controller 15 slowly reduces the impedance of the controllable impedance 13 over a non-negligible period of time. Therefore, the impedance at the output terminal 14 of the circuit breaker slowly transitions from the high impedance state to a low impedance state as normal operation is resumed. The impedance is reduced to a de minimus value (such as 0.2 Ω) and remains at that value until the sensed current signal $I_{SEN}$ indicates that the current has exceeded the maximum value, at which point the operation proceeds as described above.

Figure 2:
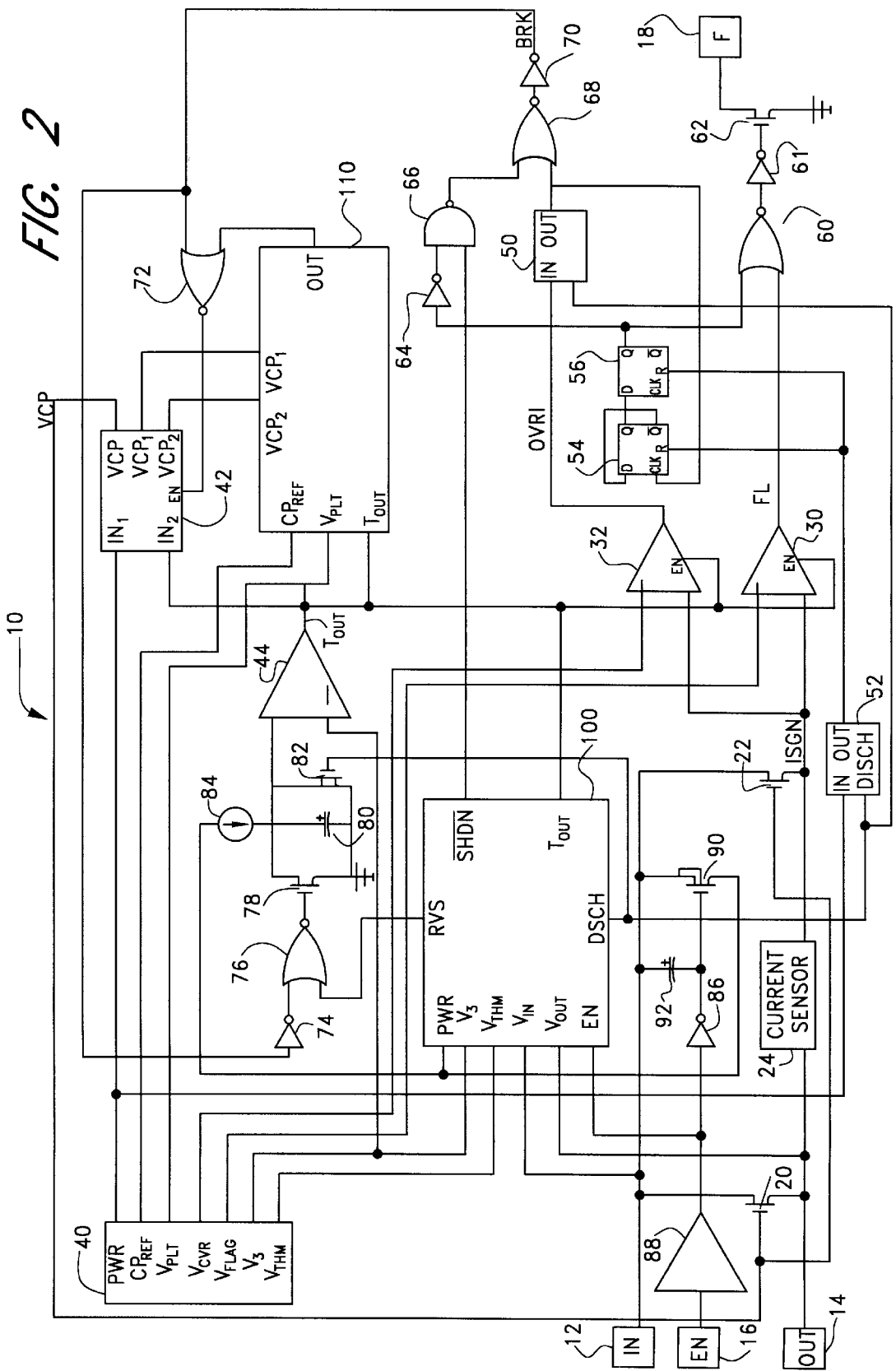
FIG. 2 is a schematic block diagram of a preferred embodiment of the electronic circuit breaker of FIG. 1.

FIG. 2 shows in detail one preferred embodiment of the electronic circuit breaker of FIG. 1. As shown, the electronic circuit breaker 10 includes an input terminal 12, an output terminal 14, an enable terminal 16, and a fault indication terminal 18. A power MOSFET ("FET") 20 (i.e., the path element) and a sense enable FET 22 are connected in parallel between the input and output terminals. The sense enable FET 22 is designed to be much smaller than (e.g., 1/1000 the size of) the power FET 20. A current sensor 24, which may be an exceedingly low impedance, generates a voltage proportional to the current flowing through the sense enable FET 22 and supplies the result in the form of a voltage signal $I_{SEN}$. An over-current comparator 32 compares the current sensor signal $I_{SEN}$ and a first reference voltage $V_{OVR}$ from a control circuit 40. The output OVRI of the over-current comparator triggers a first one-shot 50, which provides a time delay and the output of the first one-shot 50 is supplied to the clock terminals of two D flip-flops 54 and 56, that comprise the counter circuit to count to two for the maximum number of times of over-current conditions that the circuit will detect before needing an external reset.

The input terminal of the first flip-flop 54 is connected to its inverted output terminal, and the input terminal of the second flip-flop 56 is connected to the non-inverted output terminal of the first flip-flop 54. The reset terminal of each flip flop is connected to the output of a second one-shot 52. The output terminal of the second flip-flop 56 is coupled to the gate of a first N-channel FET ("NFET") 62 through a first NOR gate 60 and a first inverter 61. The first NFET 62 is connected between the fault indication terminal 18 and ground. The output FL of a flag comparator 30 is also coupled to the gate of the first NFET 62 through the first NOR gate 60 and the first inverter 61. The flag comparator 30 receives the current sensor signal $I_{SEN}$ and a second reference voltage $V_{FLAG}$ from the control circuit 40.

The output of the second flip-flop 56 is also coupled to a first NAND gate 66 through a second inverter 64. The first NAND gate 66 also receives the shutdown output/SHDN of a shutdown circuit 100. The output of the first NAND gate 66 and the output of the first one-shot 50 are coupled through the combination of a second NOR gate 68 and a third inverter 70 to generate a break control signal BRK. The break control signal BRK and the output of a charge pump control circuit 110 are coupled to the enable input of a charge pump circuit 42 through a third NOR gate 72. Additionally, the break control signal BRK is coupled to a fourth NOR gate 76 through a fourth inverter 74. The fourth NOR gate 76 also receives the reverse voltage output RVS of the shutdown circuit 100, and the gate of a second NFET 78 is connected to the output of the fourth NOR gate 76.

The second NFET 78, a third NFET 82, and a first capacitor 80 are connected in parallel between the output terminal of a current source 84 and ground. The discharge output DSCH of the shutdown circuit 100 is connected to the gate of the third NFET 82 and the DISCH terminals of the first and second one-shots 50 and 52. The output terminal of the current source 84 is also connected to an input terminal of a timing comparator 44, and a third reference voltage $V_3$ is supplied to the other input terminal of the timing comparator 44 by the control circuit 40. The output $T_{OUT}$ of the timing comparator 44 is supplied to the charge pump circuit 42, the charge pump control circuit 110, the shutdown circuit 100, and the enable inputs of the over-current and flag comparators 32 and 30. A power signal PWR from the control circuit 40 is supplied to another input of the charge pump circuit 42, the input terminal of the second one-shot 52, and the shutdown circuit 100.

The main output VCP of the charge pump circuit 42 is connected to the gates of the power FET 20 and the sense enable FET 22, and two other outputs $VCP_1$ and $VCP_2$ of the charge pump circuit are supplied to the charge pump control circuit 110. The charge pump control circuit 110 also receives a fourth reference voltage $V_{PLT}$ and a charge pump reference signal $CP_{REF}$ from the control circuit 40. Additionally, the shutdown circuit 100 is connected to the input and output terminals 12 and 14, and receives the third reference voltage $V_3$ and a thermal signal $V_{THM}$ from the control circuit 40. Further, the enable terminal 16 of the circuit breaker is coupled to the shutdown circuit 100 and a fifth inverter 86 through a non-inverting buffer 88. The output terminal of the fifth inverter 86 is connected to the gate of a P-channel FET ("PFET") 90 and one terminal of a second capacitor 92. The other terminal of the second capacitor 92 is connected to the input terminal 12 of the circuit breaker. The PFET 90 is connected between the input terminal 12 of the circuit breaker and the input terminal of the current source 84.

Figure 3:
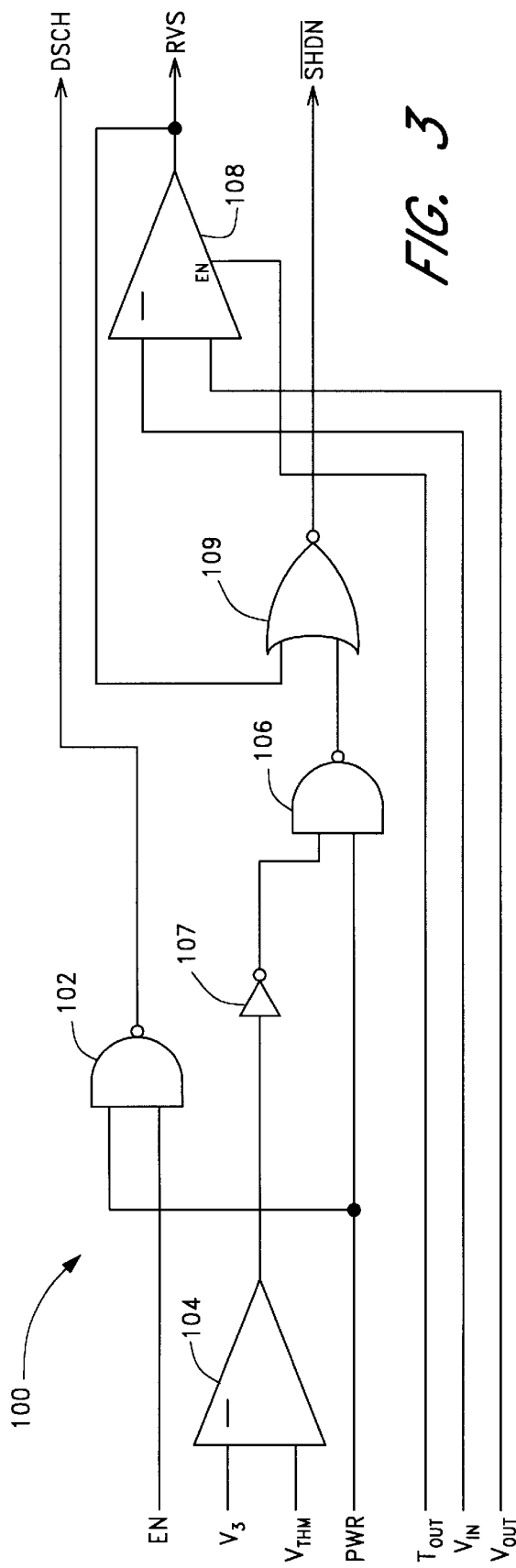
FIG. 3 is a schematic block diagram of a preferred embodiment of the shutdown circuit of FIG. 2.

The shutdown circuit 100 contains circuitry to disable current to the output terminal of the circuit breaker under certain circumstances such as overheating, insufficient power, reverse voltage, or external shutdown. FIG. 3 shows a schematic block diagram of an embodiment of the shutdown circuit that includes all of these features. As shown, a first NAND gate 102 receives the power signal PWR from the control circuit 40 and the buffered enable signal (from enable terminal 16), and generates the discharge output DSCH of the shutdown circuit.

Additionally, a reverse voltage comparator 108 has its input terminals connected to the input and output terminals 12 and 14 of the circuit breaker, and generates the reverse voltage output RVS of the shutdown circuit. The enable input of the reverse voltage comparator 108 receives the output of the timing comparator 44. A thermal comparator 104 receives the thermal signal $V_{THM}$ from the control circuit 40 and the third reference voltage $V_3$, and the output of the thermal comparator 104 is coupled to a second NAND gate 106 through an inverter 107. The power signal PWR is also supplied to the second NAND gate 106. A NOR gate 109 receives the output of the second NAND gate 106 and the output of the reverse voltage comparator 108, and generates the shutdown output /SHDN of the shutdown circuit.

Figure 4:
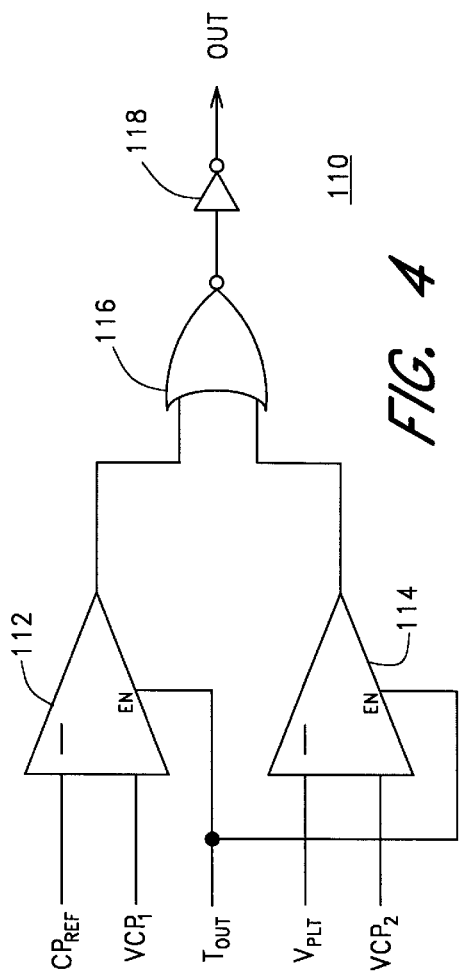
FIG. 4 is a schematic block diagram of a preferred embodiment of the charge pump control circuit of FIG. 2.

FIG. 4 shows a schematic block diagram of a preferred embodiment of the charge pump control circuit, which contains circuitry to disable the charge pump circuit if it is not operating within a certain range. As shown, a first comparator 112 receives the charge pump reference signal $CP_{REF}$ from the control circuit 40, and one of the outputs $VCP_1$ of the charge pump circuit. A second comparator 114 receives fourth reference voltage $V_{PLT}$ from the control circuit 40, and another of the outputs $VCP_2$ of the charge pump circuit. The outputs of the first and second comparators 112 and 114 are coupled through a NOR gate 116 and an inverter 118 to generate the output of the charge pump control circuit. Additionally, the enable inputs of the first and second comparators 112 and 114 receive the output of the timing comparator 44.

The operation of the electronic circuit breaker of FIGS. 1–4 will now be explained. During normal operation, the charge pump circuit 42 generates the VCP voltage at a level sufficient to turn on the power FET 20 to maximum conduction (such as 0.2 Ω) to prevent any substantial voltage drop across the power FET 20. The VCP voltage is also used to control the sense enable FET 22 so that the current flowing through the sense enable FET represents a fraction of the current flowing through the power FET. The sensed current level $I_{SEN}$, as generated across the current sensor 24, is compared with a reference level $V_{FLAG}$ by the flag comparator 30. When the sensed signal $I_{SEN}$ is above the reference level, the flag comparator outputs a high level signal that is coupled to the gate of the first NFET 62. This turns on the first NFET to ground the fault indication terminal 18. Thus, if an external LED (not shown) has its positive terminal connected to a power source and its negative terminal connected to the fault indication terminal 18 of the circuit breaker, the LED will light to signal a fault condition.

Similarly, the sensed current level $I_{SEN}$ is compared with another reference level $V_{OVR}$ by the over-current comparator 32. When the current is above this reference level, the over-current comparator outputs a high level signal to the first one-shot 50. In response, the first one-shot generates a high level pulse (e.g., a pulse of 200 ns), and thus the break control signal BRK goes high for the same period. The third NOR gate 72 changes the high level pulse into a low level pulse and supplies that low level pulse to the enable input of the charge pump 42 in order to disable the charge pump. The low level of the enable signal disables the VCO clock (not shown) of the charge pump circuit 42 to cause the VCP output of the charge pump circuit to discharge almost immediately to a minimal level, thereby changing the conductivity of transistor 20 and sense transistor 22 to be a high impedance. Thus, when the current $I_{SEN}$ exceeds the over-current level, the power FET is temporarily shut off to interrupt current to the output terminal 14.

Additionally, the high level pulse of the break control signal BRK is supplied to the timer circuit through the fourth NOR gate 76 and the fourth inverter 74. Therefore, as long as the reverse voltage output RVS of the shutdown circuit 100 is at the low level, a high level pulse is supplied to the gate of the second NFET 78. This discharges the first capacitor 80. When the voltage across the capacitor falls below a reference level $V_3$, the output $T_{OUT}$ of the timing comparator changes to the low level to disable the over-current comparator 32, the flag comparator 30, the reverse voltage comparator 108, and the two comparators 112 and 114 of the charge pump control circuit 110.

Further, the output pulse from the first one-shot 50 is used to clock the first and second flip-flops 54 and 56. As described below, both flip-flops are initially reset by the second one-shot 52. Because the input terminal of the first flip-flop is connected to its inverting output terminal, the clock pulse from the first one-shot causes the output of the first flip-flop to go to the high level. At this point, the output of the second flip-flop remains at the low level.

When the break control signal BRK returns to the low level, the enable input of the charge pump circuit is returned to the high level. Thus, the VCP output of the charge pump so the power FET 20 is turned back on. In this manner, the circuit breaker is automatically reset and current once again flows to the output terminal 14. Additionally, the transition of the break control signal BRK causes the second FET 78 to be turned off so that the first capacitor 80 can be recharged by the current source 84. Once the voltage across the capacitor rises above the reference level $V_3$, the output $T_{OUT}$ of the timing comparator changes to the high level to re-enable the over-current comparator 32, the flag comparator 30, and the comparators in the shutdown and charge pump control circuits. In this manner, the circuit breaker is tripped and automatically reset in response to a first over-current condition.

After current through the circuit breaker is re-started, if the sensed current level $I_{SEN}$ again rises above the reference level $V_{OVR}$, the over-current comparator 32 again outputs a high level signal to the first one-shot 50. In response, the first one-shot again generates a high level pulse. This causes the break control signal BRK to also go to the high level, and thus disables the charge pump and discharges the first capacitor in the same manner as described above.

Additionally, the output pulse from the first one-shot again clocks the first and second flip-flops 54 and 56. Because the input terminal of the second flip-flop is connected to the output terminal of the first flip flop, the second clock pulse from the first one-shot causes the output of the second flip-flop to go to the high level. This causes the output of the first NAND gate 66 to go to the high level, and thus the break control signal BRK is held at the high level after the output of the first one-shot returns to the low level. As a result, the charge pump is maintained in the disabled state and the circuit breaker is not reset. The output of the second flip-flop is also coupled to the gate of the first NFET 62 so the fault indication terminal 18 is grounded to signal a fault condition. At this point, power (i.e., the input voltage) or the circuit breaker enable terminal must be cycled from high to low and then back to high to reset the circuit breaker and resume normal operation.

More specifically, when power (Vcc) to the circuit breaker is removed and then restored, the power signal PWR from the control circuit 40 goes to the low level and then returns to the high level. This causes the second one-shot 52 to output a high level pulse, and thus resets the first and second flip-flops. Alternatively, when the enable terminal 16 is dropped to the low level, the discharge output DSCH of the shutdown circuit 100 goes to the high level. When the enable terminal is then raised to the high level, the discharge output DSCH returns to the low level, and thus the second one-shot 52 outputs a high level pulse to reset the two flip-flops. Either way, the output of the break control signal BRK is returned to the low level so that normal operation can continue. At this point, both flip-flops are reset so the circuit breaker will again automatically reset itself in response to the next over-current condition. In this manner, when the current through the power FET exceeds the over-current level a second time, the power FET is shut off to stop current to the output terminal. The circuit breaker must be externally reset to re-start the current.

Figure 5:
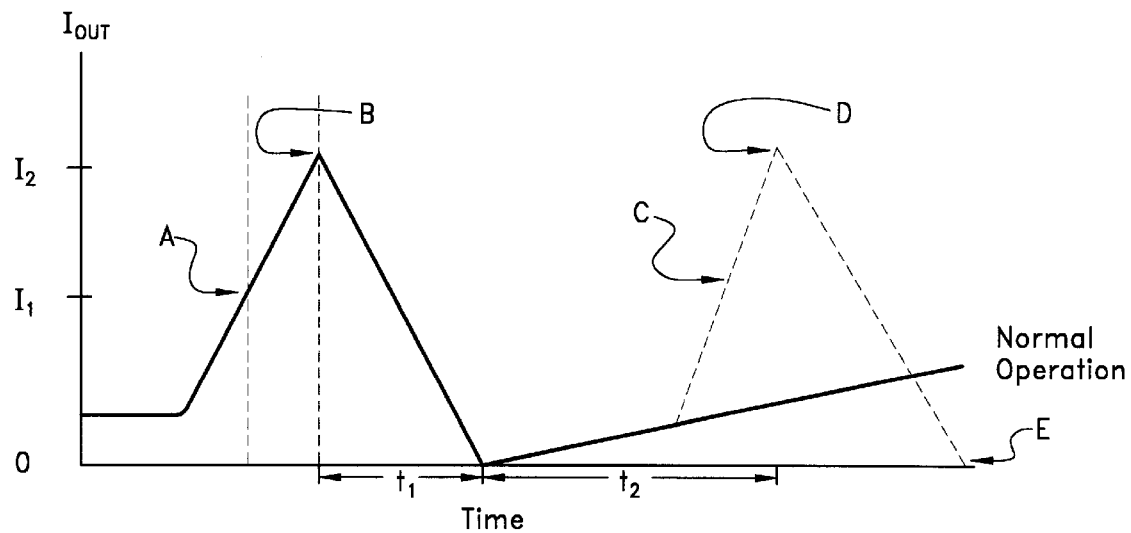
FIG. 5 is a graph illustrating the over-current protection function of the circuit breaker of FIG. 2.

FIG. 5 shows a specific example of the over-current protection operation in the circuit breaker described above. At point A, the current through the power FET reaches the flag level $I_1$, so the fault indication terminal is grounded to signal a fault condition. At point B, the current through the power FET reaches the over-current level $I_2$, so the output is shut down within a first time period $t_1$. After the output is shut down, the circuit breaker automatically resets itself and restarts current output using the "soft-start" procedure described below. If the over-current condition no longer exists, normal operation is resumed. On the other hand, if the current once again reaches the flag level $I_1$ (point C), the fault indication terminal is again grounded to signal a fault condition. Further, if the current continues to rise until it reaches the over-current level $I_2$ for a second time (point D), the output is again shut down. After the second shutdown (point E), the circuit breaker must be externally reset to resume normal operation.

Figure 6:
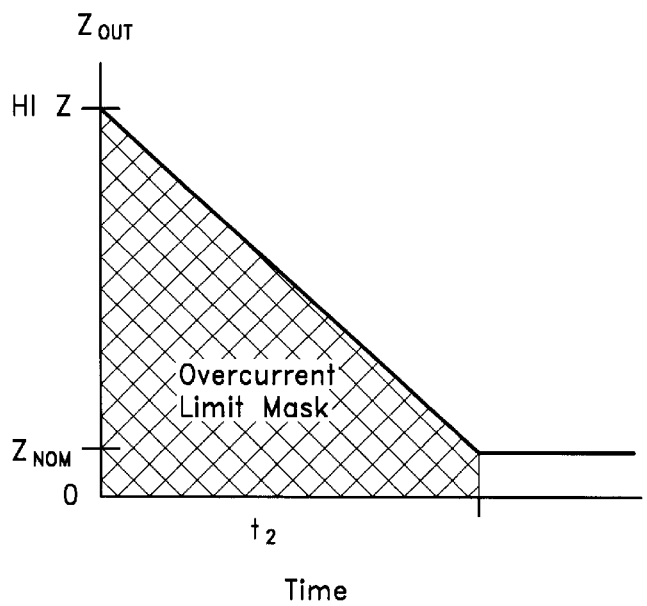
FIG. 6 is a graph illustrating the soft-start operation of the circuit breaker of FIG. 2.

An illustration of the soft-start operation of the circuit breaker is shown in the graph of FIG. 6. When the output of the circuit breaker is shut down, the gate of the power FET receives a ground level VCP signal to prevent current from flowing through the circuit breaker. In order to turn on the circuit breaker so that current can flow to the output terminal, the gate voltage (i.e., VCP) of the power FET is increased. According to the soft-start operation, the VCP voltage from the charge pump circuit is slowly increased over a time period $t_2$, which is relatively long when compared with the time $t_1$ required to shut down the output of the circuit breaker.

During this process, the impedance $Z_{OUT}$ at the output terminal of the circuit breaker slowly transitions from a high impedance state HI Z as the gate voltage of the power FET rises, as shown in FIG. 6. At the end of the soft-start operation, the output impedance is reduced to a nominal low impedance value $Z_{NOM}$, and the circuit breaker is set for normal operation. Further, during the soft-start operation, the over-current limit is masked to prevent current glitches from causing an over-current condition and tripping the circuit breaker. In this manner, the soft-start operation reduces the occurrence of large currents during power-up, and thus makes it is less likely that the circuit breaker will be arbitrarily tripped. In the preferred embodiment, the soft-start operation occurs during power-up (i.e., initially and anytime the input voltage is dropped below a minimum level and then raised again), during the automatic reset operation described above, and when the enable terminal of the circuit breaker is changed to the high level.

The operation of other features of the preferred embodiment of the electronic circuit of the present invention will now be briefly explained with reference to FIGS. 1–4. An enable circuit is provided to allow the circuit breaker to be shut down externally. When a low level voltage is applied to the enable terminal 16 of the circuit breaker, the buffer 88 supplies a low level signal the enable input EN of the shutdown circuit 100. As shown in FIG. 3, when the enable input EN of the shutdown circuit is at the low level, the first NAND gate 102 outputs a high level signal as the discharge output DSCH. This high level signal is supplied to the gate of the third NFET 82 so that a discharge path is provided for the first capacitor 80.

When the voltage across the capacitor falls below a reference level $V_3$, the output $T_{OUT}$ of the timing comparator 44 changes to the low level to disable various comparators (as described above) and to disable the charge pump circuit 42. The high level of the discharge output DSCH of the shutdown circuit 100 also resets the first and second one-shot circuits 50 and 52. Additionally, the low level output of the buffer 88 causes a high level to be applied to the gate of the PFET 90. Therefore, PFET 90 is turned off to disable the current source 84 and thus prevent unnecessary current consumption through the third NFET 82. In this manner, the enable terminal allows the circuit breaker to be externally shut down and put into a low current-consumption mode.

The shutdown circuit 100 also includes circuitry to shut down the circuit breaker in cases of overheating, insufficient power, and reverse voltage conditions. The control circuit 40 supplies the shutdown circuit with a thermal signal $V_{THM}$ whose level rises as the temperature of the circuit breaker rises. When the thermal signal $V_{THM}$ is above a reference level $V_3$, the thermal comparator 104 outputs a high level signal that is inverted by the inverter 107. In response, the second NAND gate 106 outputs a high level signal, and thus the NOR gate 109 outputs a low level signal as the shutdown output /SHDN of the shutdown circuit 100.

Similarly, the power signal PWR, which is supplied to the shutdown circuit by the control circuit 40, goes to the low level when the input voltage falls below a minimum level. The low level of the power signal PWR causes the first NAND gate 102 to output a high level signal as the discharge output DSCH of the shutdown circuit. The effect of a low level discharge output DSCH is explained above with reference to the enable function. The low level power signal PWR disables the charge pump circuit 42. Additionally, the low level of the power signal PWR causes the second NAND gate 106 to output a high level signal, and thus the NOR gate 109 outputs a low level signal as the shutdown output/SHDN. Further, when the voltage level $V_{OUT}$ of the output terminal 14 exceeds the voltage level $V_{IN}$ of the input terminal 14 by a predetermined amount, the reverse voltage comparator 108 outputs a high level signal as the reverse voltage output RVS of the shutdown circuit 100. This causes the NOR gate 109 to output a low level signal as the shutdown output/SHDN. Thus, the shutdown output/SHDN is dropped to the low level in response to overheating, insufficient power, or a reverse voltage condition.

Whenever the shutdown signal/SHDN is at the low level, the first NAND gate 66 of the circuit breaker outputs a high level signal. This causes the break control signal BRK to rise to the high level. As described above, a high level break control signal BRK disables the VCO clock of the charge pump circuit so that current to the output terminal 14 is interrupted. Thus, in response to overheating, insufficient power, or a reverse voltage condition, the output of the circuit breaker is shut down. Additionally, the high level break control signal also turns on the second NFET 78 to discharge the first capacitor 80 and thus disable various comparators as described above.

However, if the reverse voltage output RVS of the shutdown circuit 100 is at the high level, the fourth NOR gate 76 outputs a low level signal regardless of the level of the break control signal BRK to prevent the second NFET 78 from being turned on. This is necessary to prevent the reverse voltage comparator itself from being disabled in response to a reverse voltage condition. Thus, various comparators within the circuit breaker are disabled in response to overheating or insufficient power conditions. When overheating, insufficient power, and reverse voltage conditions all no longer exist, the shutdown output is raised to the high level and the circuit breaker resumes normal operation.

The charge pump control circuit contains circuitry to disable the charge pump circuit if it is not operating within a certain range. As shown in FIG. 4, if one of the outputs $VCP_1$ of the charge pump circuit 42 is above the level of the charge pump reference signal $CP_{REF}$, the first comparator 112 outputs a high level signal. Similarly, if another of the outputs $VCP_2$ of the charge pump circuit is above the level of the fourth reference voltage $V_{PLT}$, the second comparator 114 outputs a high level signal. If either of the comparators 112 and 114 outputs a high level signal, the output OUT of the charge pump control circuit is generated at the high level. This causes the third NOR gate 72 to output a low level signal to the enable input of the charge pump circuit 42. As a result, the VCO clock of the charge pump circuit is disabled until the condition is removed. If the condition is not removed, current to the output terminal 14 of the circuit breaker is eventually interrupted. Thus, the charge pump control circuit insures that the charge pump circuit is operating within the prescribed range.

Figure 7:
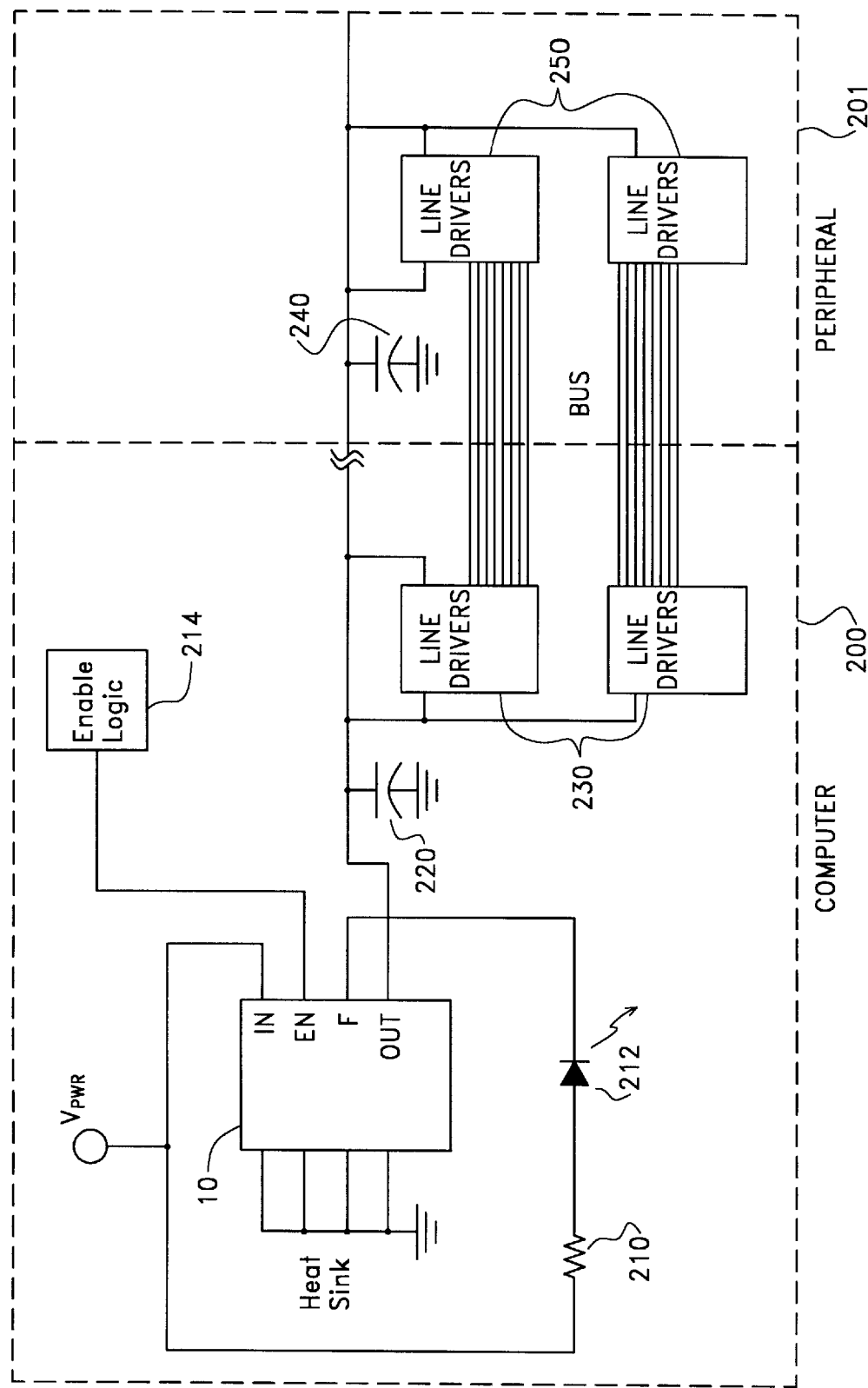
FIG. 7 is a block diagram of a computer system that includes the circuit breaker of FIG. 2.

FIG. 7 is a block diagram of a computer system that includes the circuit breaker of FIG. 2. As shown, the input terminal IN of the circuit breaker 10 is connected to the power source $V_{PWR}$ of a host computer 200, and the enable terminal EN of the circuit breaker is connected to enable logic 214 located within the computer. A resistor 210 and an LED 212 are connected in series between the computer's power source $V_{PWR}$ and fault terminal F of the circuit breaker. Additionally, heat sink terminals of the circuit breaker 10 are connected to the ground terminal of the host computer 200. The output terminal OUT of the circuit breaker 10 is connected to an internal capacitance 220 and the power terminals of line drivers 230 for the computer's external bus BUS (e.g., SCSI bus). In other words, the output terminal OUT acts as the power source for the bus BUS.

When a peripheral device 201 is connected to the external bus, an internal capacitance 240 and the power terminals of line drivers 250 within the peripheral 201 are connected to the output terminal OUT of the circuit breaker. If the peripheral requires so much current that it causes an over-current condition in the circuit breaker, the output current from the circuit breaker will be interrupted and then automatically re-started as described above.

Accordingly, preferred embodiments of the present invention provide an electronic circuit breaker that is automatically reset only a limited number of times. If a fault condition exists after the circuit breaker has been automatically reset a predetermined number of times, current is permanently disabled until the circuit breaker is externally reset. Thus, power consumption is decreased, and there is less of a chance of damaging the devices connected through the circuit. Additionally, the circuit breaker has a "soft-start" capability. When the circuit breaker is reset, the output terminal slowly transitions from high impedance to low impedance over a predetermined time period. Therefore, the occurrence of large currents during power-up, and thus the chance of a current glitch arbitrarily tripping the circuit breaker, are decreased.

The embodiments of the present invention described above relate to an electronic circuit breaker that does not automatically reset itself after a second fault condition. However, the number of automatic resets and the actual logic elements used to count the number of resets are merely matters of design choice. Depending on the specific application, the circuit breaker could easily be adapted by one skilled in the art to automatically reset any number of times. Additionally, the number of automatic resets could be set by an external signal. In this way, a circuit designer could tailor the characteristics of the circuit breaker to the specific needs of the application.

Other design choices, such as the shutdown and soft-start time periods, the periods of the one-shots, and the sizes of the current source and capacitors could also easily be adapted. For example, in the preferred embodiment, the time period t1 is approximately 100 ns, the time period t2 is approximately 100 $\mu$s, the first one-shot has a period of 200 ns, the second one-shot has a period of 100 ns, the current source is a 1 $\mu$A source, the first capacitor has a capacitance of 80 pF, and the second capacitor has a capacitance of 2 pF. However, in other embodiments, these values could be altered based on the specific performance characteristics desired. Similarly, while in the preferred embodiment the nominal output impedance is 0.2 $\Omega$ and the fault and over-current levels are respectively 1.65 A and 2.0 A, these values could easily be varied by one skilled in the art. Additionally, such values could be fixed or made externally programmable. Further, embodiments of the present invention may not include all of the features described above. For example, an enable circuit, a thermal shutdown circuit, a low power shutdown circuit, a reverse voltage shutdown circuit, and a fault indication circuit may not be available in all embodiments.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the following claims.

What is claimed is:

1. A monolithic electronic circuit breaker comprising:
   an input terminal;
   an output terminal;
   a controllable path element connected between the input terminal and the output terminal to control current flow between the input and output terminals;
   a current sensor generating a current magnitude signal indicative of the current flowing between the input terminal and the output terminal;
   an over-current circuit responsive to the current sensor to generate an over-current signal when the current magnitude signal exceeds a first threshold;
   a control circuit coupled to the path element and the over-current circuit, wherein in response to at least a first occurrence of the over-current signal, the control circuit controls the path element so as to reduce current between the input and output terminals for a first period of time, and then automatically increases current between the input and output terminals after the first period of time; and
   a counting circuit coupled to the control circuit, the counting circuit disabled during a second period of time following the first period of time, the counting circuit configured to count after the second period of time each N occurrence of the over-current signal, and wherein in response to an $N^{th}$ occurrence of the over-current signal, N being an integer greater than one, the control circuit controls the path element so as to reduce current between the input terminals and does not thereafter automatically increase current between the input and output terminals.

2. The electronic circuit breaker as defined in claim 1, wherein N is 2.

3. The electronic circuit breaker as defined in claim 1, wherein after the $N^{th}$ occurrence of the over-current signal, the current between the input and output terminals is increased after the circuit breaker is externally reset.

4. The electronic circuit breaker as defined in claim 1, wherein the controllable path element is a transistor, and the control circuit includes a charge pump circuit that supplies a voltage signal to the control terminal of the transistor to control the impedance of the transistor.

5. The electronic circuit breaker as defined in claim 1, wherein the control circuit includes a counting circuit that counts the number of occurrences of the over-current signal and outputs a maximum count signal when N occurrences of the over-current signal have been counted.

6. The electronic circuit breaker as defined in claim 5, wherein after the $N^{th}$ occurrence of the over-current signal, the current between the input and output terminals is not increased until an external event triggers a resetting of the counting circuit.

7. The electronic circuit breaker as defined in claim 1, further comprising an enable circuit that allows current from the input terminal to the output terminal to be interrupted in response to an external enable signal.

8. A monolithic electronic circuit breaker comprising:
an input terminal;
an output terminal;
a controllable path element connected between the input terminal and the output terminal to control current flow between the input and output terminals;
a current sensor generating a current magnitude signal indicative of the current flowing between the input terminal and the output terminal;
an over-current circuit responsive to the current sensor to generate an over-current signal when the current magnitude signal exceeds a threshold;
an enable circuit that allows current from the input terminal to the output terminal to be interrupted in response to an external enable signal; and
a control circuit coupled to the path element and the over-current circuit, wherein in response to at least a first occurrence of the over-current signal, the control circuit controls the path element so as to reduce current between the input and output terminals for a period of time, and then automatically increase current between the input and output terminals after the period of time, wherein in response to an $N^{th}$ occurrence of the over-current signal, N being an integer greater than one, the control circuit controls the path element so as to reduce current between the input terminals and does not thereafter automatically increase current between the input and output terminals, and wherein after the $N^{th}$ occurrence of the over-current signal, the current between the input and output terminals is increased after the circuit breaker is externally reset by transitioning the external enable signal from an enable state to a disable state and then back to the enable state.

9. The electronic circuit breaker as defined in claim 8, further comprising a thermal shutdown circuit that interrupts current from the input terminal to the output terminal when the temperature of the circuit breaker exceeds a temperature threshold.

10. The electronic circuit breaker as defined in claim 8, further comprising a low power shutdown circuit that interrupts current from the input terminal to the output terminal when the voltage at the input terminal is below an input voltage threshold.

11. A monolithic electronic circuit breaker comprising:
an input terminal;
an output terminal;
a controllable path element connected between the input terminal and the output terminal to control current flow between the input and output terminals;
a current sensor generating a current magnitude signal indicative of the current flowing between the input terminal and the output terminal;
an over-current circuit responsive to the current sensor to generate an over-current signal when the current magnitude signal exceeds a threshold;
a low power shutdown circuit that interrupts current from the input terminal to the output terminal when the voltage at the input terminal is below an input voltage threshold; and
a control circuit coupled to the path element and the over-current circuit, wherein in response to at least a first occurrence of the over-current signal, the control circuit controls the path element so as to reduce current between the input and output terminals for a period of time, and then automatically increases current between the input and output terminals after the period of time, and wherein in response to an $N^{th}$ occurrence of the over-current signal, N being an integer greater than one, the control circuit controls the path element so as to reduce current between the input terminals and does not thereafter automatically increase current between the input and output terminals, wherein after the $N^{th}$ occurrence of the over-current signal, the current between the input and output terminals is increased after the circuit breaker is externally reset by reducing the voltage at the input terminal to below the input voltage threshold and then raising the voltage at the input terminal to above the input voltage threshold.

12. The electronic circuit breaker as defined in claim 11, further comprising a reverse voltage shutdown circuit that interrupts current from the input terminal to the output terminal when the voltage at the output terminal exceeds the voltage at the input terminal.

13. The electronic circuit breaker as defined in claim 11, further comprising a fault indication circuit that indicates a condition in which current between the input and output terminals has been reduced and will not be automatically increased because the over-current signal has been generated N times.

14. The electronic circuit breaker as defined in claim 11, wherein the controllable path element is a transistor switch that is opened to reduce current between the input and output terminals so as to reduce the current to essentially zero.

15. The electronic circuit breaker as defined in claim 11,
wherein the controllable path element is a controllable impedance, and
to automatically increase current between the input and output terminals, the impedance of the controllable impedance is gradually decreased over a time period so as to provide a soft start.

16. The electronic circuit breaker as defined in claim 11,
wherein the controllable path element is a transistor, and
after the current through the transistor is reduced for the period of time, the current through the transistor is automatically increased by gradually increasing the voltage supplied to the control terminal of the transistor over a predetermined time period, in order to slowly transition the controllable path element at the output terminal of the circuit breaker from a high impedance state to a low impedance state.

17. The electronic circuit breaker as defined in claim 11, wherein the input terminal of the circuit breaker is connected to a power source for a computer and the output terminal of the circuit breaker is connected to power terminals for the computer's external bus so that the output terminal acts as the power source for the bus.

18. A monolithic electronic circuit breaker comprising:
an input terminal;
an output terminal;
a controllable impedance in communication with the input terminal and the output terminal to control current flow between the input and output terminals;
a current sensor generating a current magnitude signal indicative of the current flowing between the input terminal and the output terminal; and
an over-current and control circuit coupled to the current sensor and the controllable impedance, the over-current and control circuit controlling with a current source, the impedance of the controllable impedance so as to reduce current between the input and output terminals when the current magnitude signal exceeds a threshold; and wherein a first time period after the over-current and control circuit reduces current between the input and output terminals, the over-current and control circuit with the current source, automatically increases current between the input and output terminals by gradually reducing the impedance of the controllable impedance over a second time period, in order to slowly transition the impedance at the output terminal of the circuit breaker from a high impedance state to a low impedance state.

19. A monolithic electronic circuit breaker comprising:

an input terminal;

an output terminal;

a controllable impedance connected between the input terminal and the output terminal to control current flow between the input and output terminals;

a current sensor generating a current magnitude signal indicative of the current flowing between the input terminal and the output terminal; and an over-current and control circuit coupled to the current sensor and the controllable impedance, the over-current and control circuit controlling the impedance of the controllable impedance so as to reduce current between the input and output terminals when the current magnitude signal exceeds a threshold, wherein a first time period after the over-current and control circuit reduces current between the input and output terminals, the over-current and control circuit automatically increases current between the input and output terminals by gradually reducing the impedance of the controllable impedance over a second time period in order to slowly transition the impedance at the output terminal of the circuit breaker from a high impedance state to a low impedance state, and wherein during the second time period, an over-current limit is masked to prevent the over-current and control circuit from again reducing current through the controllable impedance if the current magnitude signal exceeds the threshold.

20. The electronic circuit breaker as defined in claim 19, wherein the controllable impedance further comprises a transistor, and the over-current and control circuit further comprises a charge pump circuit that is in communication with the current source, the charge pump circuit configured to supply a voltage signal to the control terminal of the transistor to control the impedance of the transistor.

21. The electronic circuit breaker as defined in claim 19, wherein the over-current and control circuit also gradually reduces the impedance of the controllable impedance from the high impedance state to the low impedance state over the second time period when power is initially applied to the input terminal of the circuit breaker.

22. The electronic circuit breaker as defined in claim 19, further comprising:

a low power shutdown circuit that interrupts current from the input terminal to the output terminal when the voltage at the input terminal is below an input voltage threshold, wherein when the voltage at the input terminal rises from below the input voltage threshold to above the input voltage threshold, the over-current and control circuit increases between the input and output terminals by gradually reducing the impedance of the controllable impedance from the high impedance state to the low impedance state over the second time period.

23. The electronic circuit breaker as defined in claim 19, further comprising:

an enable circuit that allows current from the input terminal to the output terminal to be interrupted in response to an external enable signal, wherein when the external enable signal changes from a disable state to an enable state, the over-current and control circuit increases current between the input and output terminals by gradually reducing the impedance of the controllable impedance from the high impedance state to the low impedance over the second time period.

24. A method of controlling an electronic circuit breaker of the type that selectively enables current to flow between an input terminal and an output terminal, said method comprising the steps of:

sensing the current between the input terminal and the output terminal;

reducing current between the input terminal and the output terminal during a first time period when the sensed current level exceeds a first threshold;

automatically resetting the circuit breaker by increasing current between the input terminal and the output terminal after the first time period;

disabling the counting of the number of instances the sensed current exceeds the first threshold during a second time period which follows the first time period;

enabling the counting of the number of instances that the sensed current exceeds the first threshold during a third time period which follows the second time period; and after the circuit breaker has been automatically reset N−1 times, N being an integer greater than one, and the sensed current level again exceeds the first threshold, reducing current between the input terminal and the output terminal until the circuit breaker is externally reset.

25. The method as defined in claim 24, wherein N is 2.

26. The method as defined in claim 24, wherein after the $N^{th}$ occurrence of the over-current signal, the current between the input and output terminals is increased after the circuit breaker is externally reset.

27. A method of controlling an electronic circuit breaker of the type that selectively enables current to flow between an input terminal and an output terminal said method comprising the steps of:

sensing the current between the input terminal and the output terminal;

reducing current between the input terminal and the output terminal when the sensed current level exceeds a threshold; and automatically resetting the circuit breaker N−1 times, N being an integer greater than one, by increasing current between the input terminal and the output terminal after current has been reduced, wherein after the circuit breaker has been automatically reset N−1 times and the sensed current level again exceeds the threshold, reducing current between the input terminal and the output terminal until the circuit breaker is externally reset, wherein after the $N^{th}$ occurrence of the over-current signal, the current between the input and output terminals is increased after the circuit breaker is externally reset, and wherein the circuit breaker is externally reset by transitioning an external enable signal from an enable state to a disable state and then back to the enable state.

28. A method of controlling an electronic circuit breaker of the type that selectively enables current to flow between an input terminal and an output terminal, said method comprising the steps of:

sensing the current between the input terminal and the output terminal;

reducing current between the input terminal and the output terminal when the sensed current level exceeds a threshold; and automatically resetting the circuit breaker N−1 times, N being an integer greater than one, by increasing current between the input terminal and the output terminal after current has been reduced, wherein after the circuit breaker has been automatically reset N−1 times and the sensed current level again exceeds the threshold, reducing current between the input terminal and the output terminal until the circuit breaker is externally reset, wherein after the $N^{th}$ occurrence of the over-current signal the current between the input and output terminals is increased after the circuit breaker is externally reset, and wherein the circuit breaker is externally reset by reducing the voltage at the input terminal to below an input voltage threshold and then raising the voltage at the input terminal to above the input voltage threshold.

29. The method as defined in claim 28, wherein the current between the input and output terminals is changed by changing the level of a voltage signal that is supplied to the control terminal of a transistor connected between the input terminal and the output terminal.

30. The method as defined in claim 28, further comprising the step of indicating a condition in which current between the input and output terminals has been reduced and will not be increased until the circuit breaker is externally reset.

31. The method as defined in claim 28, wherein the circuit breaker is automatically reset by slowly transitioning the output terminal of the circuit breaker from a high impedance state to a low impedance state over a predetermined time period, so as to gradually increase the current between the input and output terminals.

32. The method as defined in claim 28, further comprising the step of connecting the circuit breaker between a power source for a computer and a power node for the computer's external bus.

33. A method of controlling an electronic circuit breaker of the type that selectively enables current to flow between an input terminal and an output terminal, said method comprising the steps of:

sensing the current between the input terminal and the output terminal;

reducing during a first time period, the current between the input terminal and the output terminal when the sensed current level exceeds a threshold; and increasing during a second time period, the current between the input terminal and the output terminal by gradually transitioning the impedance at the output terminal from a high impedance state to a low impedance state with a variable current source.

34. A method of controlling an electronic circuit breaker of the type that selectively enables current to flow between an input terminal and an output terminal, said method comprising the steps of:

sensing the current between the input terminal and the output terminal;

reducing current between the input terminal and the output terminal when the sensed current level exceeds a threshold; and a first time period after current between the input terminal and output terminal is reduced, automatically increasing current between the input terminal and the output terminal by gradually transitioning the impedance at the output terminal of the circuit breaker from a high impedance state to a low impedance state over a second time period, and wherein during the second time period, an over current limit is masked to prevent the current between the input and output terminals from again being reduced if the sensed current level exceeds the threshold.

35. The method as defined in claim 34, wherein the impedance at the output terminal is changed by changing the level of a voltage signal that is supplied to the control terminal of a transistor connected between the input terminal and the output terminal.

36. The method as defined in claim 34, further comprising the step of gradually transitioning the impedance at the output terminal of the circuit breaker from the high impedance state to the low impedance state over the second time period when power is initially applied to the circuit breaker.

37. The method as defined in claim 34, further comprising the step of gradually transitioning the impedance at the output terminal of the circuit breaker from the high impedance state to the low impedance state over the second time period when the voltage applied to the circuit breaker rises from below an input voltage threshold to above the input voltage threshold.

38. The method as defined in claim 34, further comprising the step of gradually transitioning the impedance at the output terminal of the circuit breaker from the high impedance state to the low impedance state over the second time period when an external enable signal changes from a disable state to an enable state.

* * * * *